United States Patent
Furukawa et al.

(10) Patent No.: US 9,917,326 B2
(45) Date of Patent: Mar. 13, 2018

(54) BATTERY AND METHOD OF MANUFACTURING THE SAME

(71) Applicant: Sony Corporation, Tokyo (JP)

(72) Inventors: Keiko Furukawa, Tokyo (JP); Tatsuya Furuya, Kanagawa (JP)

(73) Assignee: Murata Manufacturing Co., LTD., Kyoto (JP)

( * ) Notice: Subject to any disclaimer, the term of this patent is extended or adjusted under 35 U.S.C. 154(b) by 0 days.

(21) Appl. No.: 14/347,125

(22) PCT Filed: Sep. 28, 2012

(86) PCT No.: PCT/JP2012/075103
§ 371 (c)(1),
(2) Date: Mar. 25, 2014

(87) PCT Pub. No.: WO2013/051478
PCT Pub. Date: Apr. 11, 2013

(65) Prior Publication Data
US 2014/0220454 A1    Aug. 7, 2014

(30) Foreign Application Priority Data
Oct. 6, 2011   (JP) ................. 2011-221978

(51) Int. Cl.
*H01M 10/0562* (2010.01)
*H01M 4/62* (2006.01)
(Continued)

(52) U.S. Cl.
CPC ......... *H01M 10/0562* (2013.01); *H01M 4/62* (2013.01); *H01M 10/052* (2013.01);
(Continued)

(58) Field of Classification Search
CPC .................................................. H01M 10/0562
See application file for complete search history.

(56) References Cited

U.S. PATENT DOCUMENTS 5,707,756 A * 1/1998 Inoue ................. H01M 2/1235
429/57
6,664,006 B1 * 12/2003 Munshi ............ H01M 10/0565
29/623.1
(Continued)

FOREIGN PATENT DOCUMENTS

JP    2001-126757    5/2001
JP    2001-126758    5/2001
(Continued)

OTHER PUBLICATIONS

Mizuno et al., High lithium ion conducting glass-ceramics in the system Li2S—P2S5, Solid State Ionics, 2006, vol. 177, p. 2721-25.
(Continued)

*Primary Examiner* — Sarah A. Slifka
*Assistant Examiner* — Brian R Ohara
(74) *Attorney, Agent, or Firm* — Chip Law Group (57) ABSTRACT

A battery capable of improving ionic conduction is provided. The battery includes a cathode, an anode, and a solid electrolyte layer. One or more of the cathode, the anode, and the solid electrolyte layer includes a solid electrolyte binder.

13 Claims, 1 Drawing Sheet

(51) Int. Cl.
  *H01M 10/052* (2010.01)
  *H01M 10/0585* (2010.01)
(52) U.S. Cl.
  CPC ............ *H01M 10/0585* (2013.01); *H01M 2300/0068* (2013.01); *Y02T 10/7011* (2013.01)

(56) References Cited

U.S. PATENT DOCUMENTS

| | | | |
|---|---|---|---|
| 2004/0038131 A1 | 2/2004 | Den Boer et al. | |
| 2004/0253520 A1* | 12/2004 | Wensley et al. | 429/306 |
| 2005/0089750 A1* | 4/2005 | Ng | H01M 2/0242 |
| | | | 429/120 |
| 2005/0123829 A1* | 6/2005 | Fukui | H01M 4/0471 |
| | | | 429/164 |
| 2005/0220989 A1* | 10/2005 | Chaturvedi | H01M 4/0419 |
| | | | 427/122 |
| 2005/0244711 A1* | 11/2005 | Fukui | H01M 4/134 |
| | | | 429/217 |
| 2006/0068290 A1* | 3/2006 | Sawa | C01G 45/1228 |
| | | | 429/231.1 |
| 2006/0134517 A1* | 6/2006 | Sawa | H01M 4/131 |
| | | | 429/218.1 |
| 2006/0292449 A1* | 12/2006 | Ota | 429/322 |
| 2007/0264579 A1* | 11/2007 | Ota | 429/322 |
| 2008/0020283 A1* | 1/2008 | Miyashiro | B82Y 30/00 |
| | | | 429/322 |
| 2008/0160406 A1* | 7/2008 | Kato et al. | 429/217 |
| 2009/0061276 A1* | 3/2009 | Tamura | H01M 4/8605 |
| | | | 429/502 |
| 2009/0087731 A1* | 4/2009 | Fukui | H01M 4/131 |
| | | | 429/164 |
| 2009/0246636 A1* | 10/2009 | Chiang et al. | 429/231.95 |
| 2010/0035151 A1* | 2/2010 | Takahashi | H01M 2/266 |
| | | | 429/210 |
| 2010/0112456 A1 | 5/2010 | Kimura et al. | |
| 2011/0318650 A1* | 12/2011 | Zhang | H01M 10/0562 |
| | | | 429/320 |
| 2012/0216394 A1* | 8/2012 | Kitaura | H01M 10/052 |
| | | | 29/623.2 |

FOREIGN PATENT DOCUMENTS

| | | |
|---|---|---|
| JP | 2001-243984 | 9/2001 |
| JP | 2003-132882 | 5/2003 |
| JP | 2003-531466 | 10/2003 |
| JP | 2007-005279 | 1/2007 |
| JP | 2007-227362 | 9/2007 |
| JP | 2008-103280 | 5/2008 |
| JP | 2008-270137 | 11/2008 |
| JP | 2009-140910 | 6/2009 |
| JP | 2010-205449 | 9/2010 |
| JP | 2011-040282 | 2/2011 |

OTHER PUBLICATIONS

Office Action for CN Patent Application No. 201280047904.9, dated Dec. 8, 2017, 4.

* cited by examiner

BATTERY AND METHOD OF MANUFACTURING THE SAME

CROSS REFERENCES TO RELATED APPLICATIONS

The present application is a national stage of International Application No. PCT/JP2012/075103 on Sep. 28, 2012 and claims priority to Japanese Patent Application No. 2011-221978 filed on Oct. 6, 2011, the disclosure of which is incorporated herein by reference.

BACKGROUND

The present technology relates to a battery including a cathode, an anode, and a solid electrolyte layer and to a method of manufacturing the same.

In recent years, as various electronic apparatuses have been widely used, demand for batteries as electric power sources thereof have been rapidly expanded. Applications of the electronic apparatuses are not limited to small-sized applications such as a mobile phone and a notebook-size personal computer, and include a wide variety of applications to large-sized applications such as an electric vehicle.

As types of batteries, a primary battery capable of only discharge and a secondary battery capable of charge and discharge are known. Representative examples of the latter secondary battery may include a lithium ion secondary battery. In general, a battery includes a cathode, an anode, and a liquid electrolyte (an electrolytic solution). Both the cathode and the anode contain active materials capable of inserting and extracting an electrode reactant.

However, in the case where a battery using an electrolytic solution is used, degraded performance, a failure, or the like of an electronic apparatus may occur resulting from problems (such as liquid leakage) specific to the electrolytic solution. In particular, in the case where the lithium ion secondary battery having high energy density or the like is used, if short circuit (internal short circuit) occurs due to liquid leakage, ignition and/or the like may occur in some cases.

Therefore, in order to resolve the problems specific to the electrolytic solution, using a solid-state electrolyte (a solid electrolyte) instead of the electrolytic solution has been considered. One reason for this is that, in this case, liquid leakage does not occur, and therefore, degradation of battery performance and the like caused by corrosion are prevented. Another reason for this is that, in this case, depending on types of solid electrolytes, an electric potential window is larger than that in the case where an electrolytic solution is used, and therefore, energy density is increased. A battery using such a solid electrolyte is a battery in which a cathode and an anode are laminated with a layer (a solid electrolyte layer) containing a solid electrolyte in between, and is generally called a total solid battery.

For compositions of batteries using solid electrolytes, various considerations have been made. Specifically, using a sulfur-based material such as $Li_2S$—$P_2S_5$ as a solid electrolyte has been proposed (for example, see Non-Patent Literature 1). Further, it has been proposed that an amorphous polyaniline compound be used as a solid electrolyte, an electrode active material and the solid electrolyte be mixed, and thereafter, the resultant mixture be heated and fired (for example, see Patent Literature 1). Furthermore, it has been proposed that upon forming an electrode or a solid electrolyte layer with the use of a sintering method, an amorphous oxide be used as an auxiliary agent for sintering (for example, see Patent Literature 2). In association therewith, it has been proposed that an electrode and a solid electrolyte layer be formed with the use of a green sheet method (for example, see Patent Literature 3).

CITATION LIST

Non-Patent Literature

[Non-Patent Literature 1]: "High lithium ion conducting glass-ceramics in the system Li2 S—P2 S5," Solid State Ionics 177 (2006) pp. 2721-2725

Patent Literature

[Patent Literature 1]: Japanese Unexamined Patent Application Publication No. 2009-140910
[Patent Literature 2]: Japanese Unexamined Patent Application Publication No. 2007-005279
[Patent Literature 3]: Japanese Unexamined Patent Application Publication No. 2007-227362

SUMMARY

In a battery using an electrolytic solution, an electrode (gaps between particles such as an active material) are impregnated with the electrolytic solution, and therefore, junction areas between the particles are increased. In this case, since sufficient ionic conduction is obtained between the particles, interface resistance does not become problematic. In contrast, in a battery using a solid electrolyte, a medium such as an electrolytic solution does not exist between particles, and therefore, junction areas between the particles are not sufficient. In this case, sufficient ionic conduction is not obtained between the particles, and therefore, interface resistance becomes problematic. That is, the interface resistance between the particles is increased, and therefore, lowering of battery performance easily occurs.

Therefore, it is desirable to provide a battery capable of improving ionic conduction and a method of manufacturing the same.

A battery according to an embodiment of the present technology includes a cathode, an anode, and a solid electrolyte layer, wherein one or more of the cathode, the anode, and the solid electrolyte layer includes a solid electrolyte binder. Further, a method of manufacturing a battery according to an embodiment of the present technology includes: forming one or more of a cathode preparatory body, an anode preparatory body, and a solid electrolyte layer preparatory body to include a solid electrolyte binder; and forming one or more of a cathode, an anode, and a solid electrolyte layer by heating the solid electrolyte binder. The foregoing term "solid electrolyte binder" refers to a solid electrolyte material exercising binding characteristics when the solid electrolyte binder exists between particles such as an active material.

According to the battery according to the embodiment of the present technology, one or more of the cathode, the anode, and the solid electrolyte layer include a solid electrolyte binder, and therefore, ionic conduction is allowed to be improved. Further, according to the method of manufacturing the battery according to the embodiment of the present technology, after one or more of the cathode preparatory body and the like are formed to include the solid electrolyte binder, one or more of the cathode and the like are formed by heating the solid electrolyte binder, and therefore, a battery having improved ionic conduction is allowed to be manufactured.

Additional features and advantages are described herein, and will be apparent from the following Detailed Description and the figures.

DETAILED DESCRIPTION

Embodiments of the present technology will be described in detail with reference to the drawings. It is to be noted that the description will be given in the following order.
1. Configuration of Battery
2. Method of Manufacturing Battery
3. Modifications
<1. Configuration of Battery>

Figure 1:
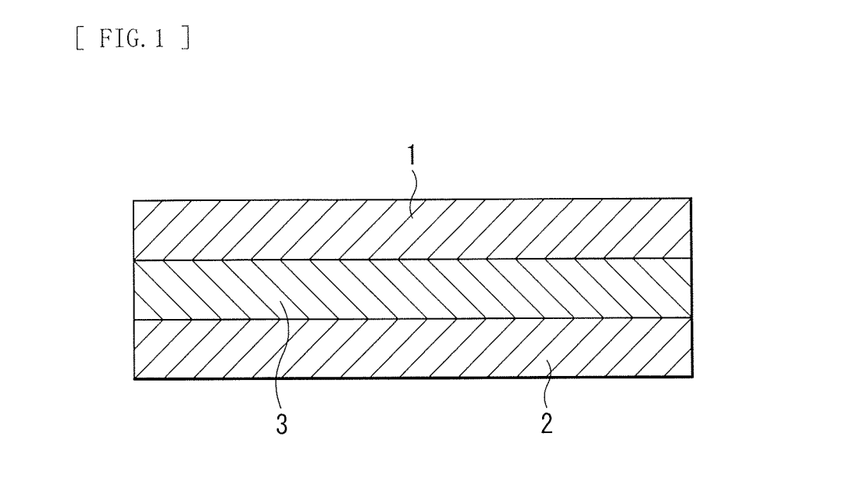
FIG. 1 is a cross-sectional view illustrating a configuration of a battery according to an embodiment of the present technology.

FIG. 1 illustrates a cross-sectional configuration of a battery in an embodiment of the present technology.

[Summary of Battery]

The battery is a so-called total solid battery, and a secondary battery capable of obtaining a battery capacity repeatedly by inserting and extracting lithium as an electrode. That is, the battery described here may be a lithium ion secondary battery capable of obtaining a capacity of an anode by inserting and extracting lithium ions, or a lithium metal secondary battery capable of obtaining a capacity of an anode by precipitation and dissolution of lithium metal.

Specifically, the battery may be, for example, as illustrated in FIG. 1, a battery in which a cathode 1 and an anode 2 are laminated with a solid electrolyte layer 3 in between.

[Cathode]

The cathode 1 contains one or more of active materials (cathode active materials) capable of inserting and extracting the electrode reactant (lithium ions), and may contain other materials such as a cathode binder, a cathode electric conductor, and a crystalline solid electrolyte as necessary.

Type of the cathode active material is not particularly limited as long as the material is capable of inserting and extracting lithium ions, and may be, for example, a lithium-containing compound. One reason for this is that, in this case, high energy density is obtained. Examples of the lithium-containing compound may include a composite oxide (a lithium-transition-metal composite oxide) containing lithium and a transition metal element as constituent elements; and a phosphate compound (a lithium-transition-metal-phosphate compound) containing lithium and a transition metal element as constituent elements. In particular, it may be preferable that the transition metal element be one or more of cobalt (Co), nickel (Ni), manganese (Mn), and iron (Fe), since a higher voltage is obtained thereby.

The chemical formula of the lithium-transition-metal composite oxide may be expressed, for example, by $Li_xM1O_2$, $Li_yM2O_4$, or the like. The chemical formula of the lithium-transition-metal-phosphate compound may be expressed, for example, by $Li_zM3PO_4$ or the like. In the formulas, M1 to M3 represent one or more transition metal elements, and values of x to z are arbitrary values.

Examples of the lithium-transition-metal composite oxide may include $LiCoO_2$, $LiNiO_2$, $LiVO_2$, $LiCrO_2$, and $LiMn_2O_4$. Examples of the lithium-transition-metal-phosphate compound may include $LiFePO_4$ and $LiCoPO_4$.

In addition thereto, the cathode active material may be, for example, an oxide, a disulfide, a chalcogenide, an electrically-conductive polymer, or the like. Examples of the oxide may include titanium oxide, vanadium oxide, and manganese dioxide. Examples of the disulfide may include titanium disulfide and molybdenum sulfide. Examples of the chalcogenide may include niobium selenide. Examples of the electrically-conductive polymer may include sulfur, polyaniline, and polythiophene.

Examples of the cathode binder may include one or more of synthetic rubbers, polymer materials, and the like. Examples of the synthetic rubber may include a styrene-butadiene-based rubber, a fluorine-based rubber, and ethylene propylene diene. Examples of the polymer material may include polyvinylidene fluoride and polyimide. The cathode binder is necessitated to bind particles such as the cathode active material. However, in the case where the cathode 1 contains a solid electrolyte binder, the cathode 1 does not necessarily contain the cathode binder. As described later, when the solid electrolyte binder is heated at temperature equal to or higher than glass transition temperature Tg, the solid electrolyte binder plays a function similar to that of the binder.

Examples of the cathode electric conductor may include one or more of carbon materials and the like. Examples of the carbon materials may include graphite, carbon black, acetylene black, Ketjen black, and carbon fiber. However, the cathode electric conductor may be other material such as a metal material and an electrically-conductive polymer as long as the material has electric conductivity.

Details of the crystalline solid electrolyte are similar to those of an after-mentioned crystalline solid electrolyte contained in the solid electrolyte layer 3. Although the cathode 1 may contain or may not contain the crystalline solid electrolyte, in particular, the cathode 1 may preferably contain the crystalline solid electrolyte. One reason for this is that, in this case, ionic conduction between the cathode 1 and the solid electrolyte layer 3 is improved.

It is to be noted that the cathode 1 may include a cathode current collector. In this case, a cathode active material layer containing the foregoing cathode active material and the like is formed on the cathode current collector. Formation materials of the cathode current collector may be arbitrary, as long as the materials are electrically-conductive materials.

[Anode]

The anode 2 contains one or more of active materials (anode active materials) capable of inserting and extracting the electrode reactant (lithium ions), and may contain other materials such as an anode binder, an anode electric conductor, and a crystalline solid electrolyte as necessary. It is to be noted that details of the anode binder and the anode electric conductor may be, for example, similar to those of the cathode binder and the cathode electric conductor. However, in the case where the anode 2 contains the after-mentioned solid electrolyte binder as the cathode 1 does, the anode binder is not necessarily contained therein.

Type of the anode active material is not particularly limited as long as the material is capable of inserting and extracting lithium ions, and may be, for example, a carbon material, a metal-based material, or the like. One reason for this is that, in this case, high energy density is obtained.

Examples of the carbon materials may include graphitizable carbon, non-graphitizable carbon, graphite, mesocarbon microbeads (MCMB), and highly-oriented graphite (HOPG).

Examples of the metal-based material may be a material containing a metal element or a metalloid element capable of forming an alloy with lithium as a constituent element. More specific examples of the metal-based material may be one or more of a simple substance, an alloy, and a compound of any of silicon (Si), tin (An), aluminum (Al), indium (In), magnesium (Mg), boron (B), gallium (Ga), germanium (Ge), lead (Pb), bismuth (Bi), cadmium (Cd), silver (Ag), zinc (Zn), hafnium (Hf), zirconium (Zr), yttrium (Y), palladium (Pd), platinum (Pt), and the like. However, the term "simple substance" is not limited to a purity 100% simple substance, and may contain a small amount of impurity. Examples of the metal-based material may include Si, Sn, $SiB_4$, $TiSi_2$, SiC, $Si_3N_4$, $SiO_v$ (0<v≤2), LiSiO, $SnO_w$ (0<w≤2), $SnSiO_3$, LiSnO, and $Mg_2Sn$.

In addition thereto, the metal-based material may be a lithium-containing compound or lithium metal (a simple substance of lithium). Examples of the lithium-containing compound may include a composite oxide (a lithium-transition-metal composite oxide) containing lithium and a transition metal element as constitutional elements, and may be, for example, $Li_4Ti_5O_{12}$.

Details of the crystalline solid electrolyte are similar to those of the after-mentioned crystalline solid electrolyte contained in the solid electrolyte layer 3. Although the anode 2 may contain or may not contain the crystalline solid electrolyte as the cathode 1, in particular, the anode 2 may preferably contain the crystalline solid electrolyte. One reason for this is that, in this case, ionic conduction between the anode 2 and the solid electrolyte layer 3 is improved. In particular, both the cathode 1 and the anode 2 may preferably contain the crystalline solid electrolyte, since thereby, ionic conduction of the whole battery is further improved.

It is to be noted that, as the cathode 1, the anode 2 may include an anode current collector. In this case, an anode active material layer containing the foregoing anode active material and the like is formed on the anode current collector. Formation materials of the anode current collector may be arbitrary, as long as the materials are electrically-conductive materials.

[Solid Electrolyte Layer]

The solid electrolyte layer 3 contains one or more of crystalline solid electrolytes, and may contain other materials such as an electrolyte binder as necessary. It is to be noted that details of the electrolyte binder may be, for example, similar to those of the cathode binder. However, in the case where the solid electrolyte layer 3 contains the after-described solid electrolyte binder as the cathode 1 does, the electrolyte binder is not necessarily contained therein.

Types of the crystalline solid electrolytes are not particularly limited as long as the materials are crystalline solid electrolytes capable of conducting lithium ions, and may be, for example, an inorganic material, a polymer material, or the like. Examples of the inorganic material may include a sulfide such as $Li_2S$—$P_2S_5$, $Li_2S$—$SiS_2$—$Li_3PO_4$, $Li_7P_3S_{11}$, $Li_{3.25}Ge_{0.25}SP_{0.75}S$, and $Li_{10}GeP_2S_{12}$; and an oxide such as $Li_{1+x}Al_xTi_{2-x}(PO_4)_3$, and $La_{2/3-x}Li_{3x}TiO_3$. Examples of the polymer material may include polyethylene oxide (PEO).

[Solid Electrolyte Binder]

One or more of the cathode 1, the anode 2, and the solid electrolyte layer 3 contain the solid electrolyte binder, and such a solid electrolyte binder has characteristics showing fluidity at the time of being heated. The solid electrolyte binder may contain, for example, an element (in this example, lithium) of an electrode reactant, a glass-forming element, and one of oxygen (O) and sulfur (S) as constituent elements. Therefore, the solid electrolyte binder has ionic conduction of the electrode reactant (lithium ions).

In the case where the cathode 1, the anode 2, and the solid electrolyte layer 3 contain a plurality of particles such as an active material, the solid electrolyte binder exists in gaps between the plurality of particles as a general binder does. One reason for this is that, in a step of manufacturing a battery, the solid electrolyte binder is heated at temperature equal to or higher than the glass transition temperature Tg, and therefore, the solid electrolyte binder gets into minute gaps between the plurality of particles by utilizing capillarity. Details of the plurality of particles will be described below. Examples of particles contained in the cathode 1 may include a particulate cathode active material, a particulate cathode electric conductor, and a particulate crystalline solid electrolyte. Examples of particles contained in the anode 2 may include a particulate anode active material, a particulate anode electric conductor, and a particulate crystalline solid electrolyte. Examples of particles contained in the solid electrolyte layer 3 may include a particulate crystalline solid electrolyte and a particulate electrolyte binder.

The cathode 1 and/or the like contains the solid electrolyte binder for the following reason. Description will be given below of the reason by taking the cathode 1 as an example. However, such an example is similarly applicable to the reasons why the anode 2 and the solid electrolyte layer 3 contain the solid electrolyte binder.

Firstly, since the solid electrolyte binder shows fluidity at the time of heating, the solid electrolyte binder gets into minute gaps between particles by utilizing capillarity as described above. Thereby, the solid electrolyte binder plays a role to bind the particles in the cathode 1. Therefore, in this case, the particles are easily bound with the solid electrolyte binder in between, compared to in a case where a binder not showing fluidity at the time of heating is used.

Secondly, since the cathode active material particles are bound with the solid electrolyte binder having ionic conduction in between as described above, a conduction path of lithium ions is secured between the particles. Thereby, junction areas between the particles are increased, increase of interface resistance between the particles is suppressed, and therefore, lowering of battery performance is suppressed compared to in a case where a binder not having ionic conduction is used.

Thirdly, as a method of improving ionic conduction of the cathode 1, a method in which a crystalline solid electrolyte is contained in the cathode 1, and the content of the crystalline solid electrolyte is increased may be presumable. However, in the case where the content of the cathode active material becomes relatively and excessively small, the capacity per the weight of the battery or cubic volume thereof is decreased while the ionic conduction of the cathode 1 is improved. In contrast, in the case where the solid electrolyte binder showing fluidity at the time of heating is used, sufficient binding characteristics and ionic conduction are obtained by utilizing the foregoing capillarity even if the content of the solid electrolyte binder is not much high. Therefore, the capacity per the weight of the battery or cubic volume thereof is secured.

In particular, the solid electrolyte binder may be preferably glassy. One reason for this is that, in this case, the solid electrolyte binder more easily gets into more minute gaps, and therefore, higher effects are obtained.

The glass-forming element is an element vitrifiable alone or in combination with other element. Examples of the glass-forming element may include one or more of silicon (Si), boron (B), phosphorus (P), germanium (Ge), arsenic (As), tellurium (Te), aluminum (Al), gallium (Ga), titanium (Ti), bismuth (Bi), tungsten (W), molybdenum (Mo), niobium (Nb), and vanadium (V). It is to be noted that the foregoing term "other element" may refer to, for example, an alkali metal element, an alkaline-earth metal element, or the like. Examples of the alkali metal element may include lithium (Li), sodium (Na), and potassium (K). Examples of the alkaline-earth metal element may include magnesium (Mg) and calcium (Ca).

More specifically, the solid electrolyte binder may be a material having one or more of $Li_x$-M-$O_y$ bonds (x and y are arbitrary values), where the foregoing one or more glass-forming elements are M, for example. Examples of the $Li_x$-M-$O_y$ bonds may include Li—Si—O bond, Li—P—O bond, Li—B—O bond, Li—Ge—O bond, Li—V≤O bond, $Li_4$—Si—$O_4$ bond, $Li_4SiO_4$—$Li_3BO_3$ bond, and Li—Zr—Si—P—O bond. It goes without saying that the solid electrolyte binder may be a material having a bond obtained by substituting sulfur (S) for oxygen (O) in the foregoing $Li_x$-M-$O_y$ bond.

It is to be noted that the solid electrolyte binder may further contain other element as a constituent element. The foregoing term "other element" may refer to, for example, one or more of halogen elements such as fluorine (F) and chlorine (Cl), and may be an element other than such halogen elements.

The solid electrolyte binder may be formed with the use, for example, of one or more glass-forming materials. The glass-forming materials may be categorized, for example, into a net-like oxide (a net-formation oxide), a modifier oxide, and an intermediate oxide. The net-like oxide is an oxide that is vitrifiable by itself and forms a network structure. Examples of the net-like oxide may include $SiO_2$, $B_2O_3$, $P_2O_5$, and $GeO_2$. The modifier oxide is an oxide that is not vitrifiable by itself but is vitrifiable (nets are modified) in a network structure formed by the foregoing net-like oxide. Examples of the modifier oxide may include $Li_2O$. However, the modifier oxide may be other material as long as the material is an oxide containing an alkali metal element, an alkaline-earth metal element, or the like as a constituent element. The modifier oxide has characteristics to improve fluidity by cutting a glass net structure. The intermediate oxide has intermediate characteristics between the net-like oxide and the modifier oxide, and is an oxide that is less likely to become amorphous by itself, and is vitrifiable by mixing the net-like oxide and the modifier oxide. Examples of such an oxide may include an oxide of one or more high-valent ions such as aluminum (Al), gallium (Ga), titanium (Ti), zirconium (Zr), vanadium (V), and tungsten (W). Examples thereof may include $TiO_2$ and $WO_3$. Some of the intermediate oxides fulfill a function to lower heat expansion coefficient out of heat characteristics of glass.

More specifically, the solid electrolyte binder may be formed by a quenching method, a sol-gel method, or the like with the use, for example, of at least a net-like oxide (an oxide containing one or more glass-forming elements as constituent elements) and a modifier oxide (an oxide containing lithium as a constituent element). It goes without saying that an intermediate oxide may be used as necessary.

As described above, the solid electrolyte binder is contained in one or more of the cathode 1, the anode 2, and the solid electrolyte layer 3. Therefore, the solid electrolyte binder may be contained in only one of the cathode 1, the anode 2, and the solid electrolyte layer 3, may be contained in arbitrary two thereof, or may be contained in all thereof. In particular, the solid electrolyte binder may be preferably contained in all of the cathode 1, the anode 2, and the solid electrolyte layer 3, since thereby, higher effects are obtained.

[Operation of Battery]

In the battery, for example, lithium ions extracted from the cathode 1 are inserted in the anode 2 through the solid electrolyte layer 3 at the time of charge, and lithium ions extracted from the anode 2 are inserted in the cathode 1 through the solid electrolyte layer 3 at the time of discharge.

<2. Method of Manufacturing Battery>

Figure 2:
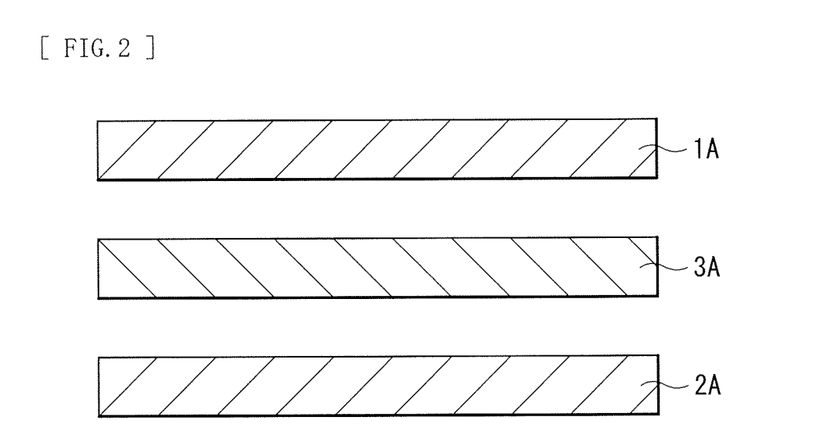
FIG. 2 is a cross-sectional view for explaining a method of manufacturing a battery according to an embodiment of the present technology.
Figure 3:
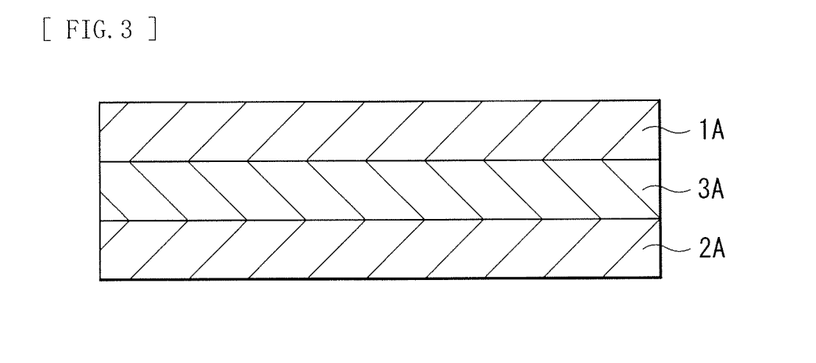
FIG. 3 is a cross-sectional view for explaining a step following a step of FIG. 2.

The battery may be manufactured, for example, by the following procedure. FIG. 2 and FIG. 3 are views for explaining a method of manufacturing the battery, and illustrate cross-sectional configurations corresponding to FIG. 1. It is to be noted that description will be given below of a case in which the crystalline solid electrolyte and the solid electrolyte binder are contained in all of the cathode 1, the anode 2, and the solid electrolyte layer 3.

The method of manufacturing the battery described here is a method in which the cathode 1, the anode 2, and the solid electrolyte layer 3 are formed with the use of a so-called green sheet method.

First, as illustrated in FIG. 2, a cathode preparatory body 1A, an anode preparatory body 2A, and a solid electrolyte layer preparatory body 3A are formed with the use of a coating method.

Upon forming the cathode preparatory body 1A, a cathode active material; a crystalline solid electrolyte; a solid electrolyte binder; and a cathode binder, a cathode electric conductor, and/or the like as necessary are mixed to obtain a cathode mixture. Subsequently, the cathode mixture is dispersed in an organic solvent or the like to obtain paste cathode slurry. Subsequently, the whole surface of a predetermined support substrate (not illustrated) is coated with the cathode slurry, and the cathode slurry is dried to form the cathode preparatory body 1A. Thereafter, the cathode preparatory body 1A is peeled off from the support substrate. The support substrate may be a film made of a polymer material such as polyethylene terephthalate (PET).

The formation procedure of the anode preparatory body 2A is similar to the formation procedure of the cathode preparatory body 1A. That is, an anode active material; a crystalline solid electrolyte; a solid electrolyte binder; and an anode binder, an anode electric conductor, and/or the like as necessary are mixed to obtain an anode mixture. Thereafter, the anode mixture is dispersed in an organic solvent or the like to obtain paste anode slurry. Subsequently, the whole surface of a support substrate is coated with the anode slurry, and the anode slurry is dried to form the anode preparatory body 2A. Thereafter, the anode preparatory body 2A is peeled off from the support substrate.

Upon forming the solid electrolyte layer preparatory body 3A, a crystalline solid electrolyte; a solid electrolyte binder; and an electrolyte binder, and/or the like as necessary are mixed to obtain an electrolyte mixture. Thereafter, the electrolyte mixture is dispersed in an organic solvent or the like to obtain paste electrolyte slurry. Subsequently, the whole surface of a support substrate is coated with the electrolyte slurry, and the electrolyte slurry is dried to form solid electrolyte layer preparatory body 3A. Thereafter, the solid electrolyte layer preparatory body 3A is peeled off from the support substrate.

It is to be noted that, upon forming the cathode preparatory body 1A, the anode preparatory body 2A, and the solid electrolyte layer preparatory body 3A, as necessary, heating may be performed at temperature less than the glass transition temperature Tg of the solid electrolyte binder.

Further, as a method of forming the cathode preparatory body 1A, the anode preparatory body 2A, and the solid electrolyte layer preparatory body 3A, methods other than the coating method may be used. Examples of the methods other than the coating method may include a vapor-phase deposition method such as an evaporation method and a sputtering method. However, in order to achieve an easy formation step in the thermoneutral environment, the coating method may be preferably used. In this case, the coating method may be used as a method of forming one or more of the cathode preparatory body 1A, the anode preparatory body 2A, and the solid electrolyte layer preparatory body 3A. In particular, it may be preferable that the coating method be used as a method of all thereof, since thereby, manufacturing steps of the battery become easier. Further, as a method other than the coating method, for example, a method in which an active material and/or the like in a powder state is pressed and formed with the use of a pressing machine or the like may be used. The shape after the pressure formation is not particularly limited, and may be, for example, a pellet state (coin type).

Next, as illustrated in FIG. 3, the cathode preparatory body 1A and the anode preparatory body 2A are laminated with the solid electrolyte layer preparatory body 3A in between.

Finally, the cathode preparatory body 1A, the anode preparatory body 2A, and the solid electrolyte layer preparatory body 3A are heated at temperature equal to or higher than the glass transition temperature Tg of the solid electrolyte binder to form the cathode 1, the anode 2, and the solid electrolyte layer 3 that are illustrated in FIG. 1.

Heating temperature is not particularly limited, as long as the temperature is equal to or higher than the glass transition temperature Tg of the solid electrolyte binder. It is to be noted that, in the case where the cathode preparatory body 1A, the anode preparatory body 2A, and the solid electrolyte layer preparatory body 3A contain two or more types of solid electrolyte binders, the heating temperature is set to a value equal to or higher than the highest temperature out of the glass transition temperature Tg of the respective solid electrolyte binders. In particular, the heating temperature may be preferably temperature equal to or less than decomposition temperature of the solid electrolyte binder in order to secure a binding function by the solid electrolyte binder.

By the heating treatment, in the cathode preparatory body 1A, the solid electrolyte binder is softened to show fluidity. Therefore, the solid electrolyte binder gets into minute gaps between particles of the cathode active material and the like by utilizing capillarity. Thereby, in the cathode preparatory body 1A, the particles are bound with the solid electrolyte binder in between, and an ion conduction path is secured between the particles.

The flow phenomenon of the solid electrolyte binder similarly occurs in the anode preparatory body 2A and the solid electrolyte layer preparatory body 3A. That is, the solid electrolyte binder gets into minute gaps between particles of the anode active material and the like in the anode preparatory body 2A, and the solid electrolyte binder gets into minute gaps between particles of the crystalline solid electrolyte and the like in the solid electrolyte layer preparatory body 3A. Thereby, in the anode preparatory body 2A and the solid electrolyte layer preparatory body 3A, the particles are bound with the solid electrolyte binder in between, and an ion conduction path is secured between the particles.

In particular, by heating in the state in which the cathode preparatory body 1A and the anode preparatory body 2A are laminated with the solid electrolyte layer preparatory body 3A in between, the flow phenomenon of the solid electrolyte binder occurs in the vicinity of the interface between the cathode preparatory body 1A and the solid electrolyte layer preparatory body 3A. The same occurs in the vicinity of the interface between the anode preparatory body 2A and the solid electrolyte layer preparatory body 3A.

In this case, in the vicinity of the interface between the cathode preparatory body 1A and the solid electrolyte layer preparatory body 3A, the solid electrolyte binder gets into minute gaps between particles of the cathode active material and the like and particles of the crystalline solid electrolyte and the like. Thereby, between the cathode preparatory body 1A and the solid electrolyte layer preparatory body 3A, the particles are bound with the solid electrolyte binder in between, and an ion conduction path is secured between the particles. Further, in the vicinity of the interface between the anode preparatory body 2A and the solid electrolyte layer preparatory body 3A, the solid electrolyte binder gets into gaps between particles of the anode active material and the like and particles of the crystalline solid electrolyte and the like. Thereby, between the anode preparatory body 1A and the solid electrolyte layer preparatory body 3A, the particles are bound with the solid electrolyte binder in between, and an ion conduction path is secured between the particles.

Accordingly, as illustrated in FIG. 1, a battery in which the cathode 1 and the anode 2 are laminated with the solid electrolyte layer 3 in between is completed.

[Function and Effect of Battery and Method of Manufacturing the Same]

According to the battery, one or more of the cathode 1, the anode 2, and the solid electrolyte layer 3 contain the solid electrolyte binder. In this case, as described above, the solid electrolyte binder exercises fluidity by being heated in a step of manufacturing the battery. In particular, in the case where the solid electrolyte binder contains lithium, a glass-forming element, and one of oxygen and sulfur as constituent elements, favorable fluidity is exercised by heating at temperature equal to or higher than the glass transition temperature Tg. Thereby, the solid electrolyte binder gets into minute gaps between particles of an active material, a crystalline solid electrolyte, and the like. Therefore, the particles are bound, and a conduction path of lithium ions is secured between the particles. Accordingly, increase of interface resistance between the particles is suppressed, and therefore, ionic conduction is allowed to be improved.

In particular, in the case where all of the cathode 1, the anode 2, and the solid electrolyte layer 3 contain the solid electrolyte binder, the foregoing function of suppressing increase of interface resistance is obtained in all of the cathode 1, the anode 2, and the solid electrolyte layer 3, and therefore, higher effects are obtainable. Further, in the case where one or both of the cathode 1 and the anode 2 contain the crystalline solid electrolyte, ionic conduction of the whole battery is further improved, and therefore, higher effects are obtainable.

Further, according to the foregoing method of manufacturing the battery, after one or more of the cathode preparatory body 1A, the anode preparatory body 2A, and the solid electrolyte layer preparatory body 3A are formed to contain the solid electrolyte binder, the solid electrolyte binder is heated. In this case, as described above, the solid electrolyte binder gets into minute gaps between particles of an active material, a crystalline solid electrolyte, and the like. Therefore, increase of interface resistance between the particles is suppressed. Accordingly, a battery with improved ionic conduction is allowed to be manufactured easily and stably.

In particular, in the case where the cathode preparatory body 1A and the anode preparatory body 2A are laminated with the solid electrolyte layer preparatory body 3A in between, and subsequently the solid electrolyte binder is heated, higher effects are obtainable. One reason for this is that, in this case, increase of interface resistance is further suppressed in the vicinity of the interface between the cathode preparatory body 1A and the solid electrolyte layer preparatory body 3A and in the vicinity of the interface between the anode preparatory body 2A and the solid electrolyte layer preparatory body 3A as well.

<3. Modifications>

In the foregoing example, heating is performed after the cathode preparatory body 1A, the anode preparatory body 2A, and the solid electrolyte layer preparatory body 3A are laminated. However, the manufacturing procedure is not limited thereto.

Specifically, heating may be performed after the cathode preparatory body 1A and the solid electrolyte layer preparatory body 3A are laminated. In this case, the unheated anode preparatory body 2A may be laminated on the heated cathode preparatory body 1A (the cathode 1) and the heated solid electrolyte layer preparatory body 3A (the solid electrolyte layer 3), and subsequently, the foregoing anode preparatory body 2A may be heated. Alternatively, the separately heated anode preparatory body 2A (the anode 2) may be previously prepared, and the heated anode preparatory body 2A may be, for example, pressure-bonded to the heated cathode preparatory body 1A and the heated solid electrolyte layer preparatory body 3A. Similarly, the anode preparatory body 2A and the solid electrolyte layer preparatory body 3A may be laminated and subsequently heated, and thereafter, the unheated cathode preparatory body 1A may be laminated thereon and heated. Alternatively, the anode preparatory body 2A and the solid electrolyte layer preparatory body 3A may be laminated and subsequently heated, and thereafter, the heated cathode preparatory body 1A (the cathode 1) may be pressure-bonded thereto. In these cases, advantages of the flow phenomenon of the solid electrolyte binder are obtained, and therefore, similar effects are obtainable.

In particular, as described above, in order to suppress increase of interface resistance in the vicinity of the interface between the cathode preparatory body 1A and the solid electrolyte layer preparatory body 3A and in the vicinity of the interface between the anode preparatory body 2A and the solid electrolyte layer preparatory body 3A as well, it may be preferable that the cathode preparatory body 1A, the anode preparatory body 2A, and the solid electrolyte layer preparatory body 3A be laminated, and subsequently heated.

Further, as described above, part or all of the cathode preparatory body 1A, the anode preparatory body 2A, and the solid electrolyte layer preparatory body 3A may be formed with the use of a vapor-phase deposition method and/or the like. Specifically, the cathode preparatory body 1A and the solid electrolyte layer preparatory body 3A may be laminated and subsequently heated, and thereafter, the anode 2 previously formed with the use of a vapor-phase deposition method and/or the like may be pressure-bonded thereto. Similarly, the anode preparatory body 2A and the solid electrolyte layer preparatory body 3A may be laminated and subsequently heated, and thereafter, the cathode 1 previously formed with the use of a vapor-phase deposition method and/or the like may be pressure-bonded thereto. In these cases, advantages of the flow phenomenon of the solid electrolyte binder are obtained, and therefore, similar effects are obtainable.

Further, although lithium is used as an electrode reactant in the foregoing embodiment, examples are not limited thereto. As an electrode reactant, for example, other alkali metal such as sodium (Na) and potassium (K), or an alkaline-earth metal element such as magnesium (Mg) and calcium (Ca) may be used. In addition thereto, as an electrode reactant, aluminum (Al), silver (Ag), or the like may be used. In these cases, the solid electrolyte binder has ionic conduction as long as any of the foregoing elements of an electrode reactant is contained, and therefore, similar effects are obtainable.

EXAMPLES

Description will be given for details of specific examples of the present technology.

Examples 1 to 3

Pellet samples for measuring physical properties of solid electrolytes were fabricated by the following procedure, and ionic conduction thereof was compared to one another.

As illustrated in Table 1, as necessary, powder of an additive was added to powder of a solid electrolyte ($Li_{1.3}Al_{0.3}Ti_{1.7}(PO_4)_3$: LATP). Subsequently, the resultant powder mixture was formed into a state of a pellet with the use of an oil pressing machine (pressure: 10 MPa). In the examples, $B_2O_3$ or a compound (an Li—B—O compound) having an Li—B—O bond was used as an additive, and the additive amount was 1 wt % with respect to the amount (100 wt %) of an active material. It is to be noted that in the case where the Li—B—O compound was formed, a cooling method was used, and the mixture ratio between $Li_2O$ and $B_2O_3$ was $Li_2O:B_2O_3=42.7:57.3$. Subsequently, the resultant formed body was heated (at 475 deg C. for 12 hours) in the atmosphere to obtain a test pellet sample. In these examples, when differential termogravimetric simultaneous measurement (TG/DTA) was performed on the Li—B—O compound, the glass-transition end point was 471 deg C. and the crystallization onset temperature was 491 deg C., and accordingly, heating temperature was set to 475 deg C.

After gold (Au) was evaporated as electrodes on both surfaces of the pellet sample, the ion conductivity was obtained from measurement result (Cole-Cole plot) of alternating-current impedance measurement (25 deg C.). Accordingly, results illustrated in Table 1 were obtained. In these examples, Solartron 1260/1287 available from Solartron was used as a measurement device, and the measurement wavelength was from 1 MHz to 1 Hz both inclusive. It is to be noted that values of ion conductivity illustrated in Table 1 are values (standard values) standardized where the value (the absolute value) of the ion conductivity of Example 1 is 1.

TABLE 1

| | Solid electrolyte | Additive Type | Ionic conduction | Additive amount (wt %) | Ion conductivity (standard value) |
|---|---|---|---|---|---|
| Example 1 | LATP | — | — | — | 1.00 |
| Example 2 | LATP | $B_2O_3$ | Absent | 1 | 0.81 |
| Example 3 | LATP | Li—B—O compound | Present | 1 | 1.19 |

In the case where the solid electrolyte binder (the Li—B—O compound) having ionic conduction was used, the ion conductivity was increased compared to in the case where the solid electrolyte binder was not used and in the case where the glass material ($B_2O_3$) not having ionic conduction was used. From the results, it was confirmed that when the solid electrolyte binder was used, the ionic conduction was improved.

The present technology has been described with reference to the embodiments, Examples, and the modifications. However, the present technology is not limited to the examples described in the embodiments and Examples, and various modifications may be made. For example, the battery of the present technology is applicable not only to secondary batteries but also to primary batteries. In the latter case, similar effects are obtainable.

It is possible to achieve at least the following configurations from the above-described example embodiments and the modifications of the disclosure.

(1)
A battery including:
a cathode;
an anode; and
a solid electrolyte layer, wherein
one or more of the cathode, the anode, and the solid electrolyte layer include a solid electrolyte binder.

(2)
The battery according to (1), wherein
the cathode and the anode include an active material capable of inserting and extracting an electrode reactant, and
the solid electrolyte binder includes an element of the electrode reactant, a glass-forming element, and one of oxygen (O) and sulfur (S) as constituent elements.

(3)
The battery according to (2), wherein the solid electrolyte binder is glassy.

(4)
The battery according to (2) or (3), wherein
the electrode reactant is lithium (Li), and
the solid electrolyte binder includes lithium as a constituent element.

(5)
The battery according to any one of (2) to (4), wherein the glass-forming element is one or more of silicon (Si), boron (B), phosphorus (P), germanium (Ge), arsenic (As), tellurium (Te), aluminum (Al), gallium (Ga), titanium (Ti), bismuth (Bi), tungsten (W), molybdenum (Mo), niobium (Nb), and vanadium (V).

(6)
The battery according to any one of (2) to (5), wherein the solid electrolyte binder is heated at temperature equal to or higher than a glass transition temperature Tg, and gets into gaps between at least the active material by utilizing capillarity.

(7)
The battery according to any one of (1) to (6), wherein all of the cathode, the anode, and the solid electrolyte layer include the solid electrolyte binder.

(8)
The battery according to any one of (1) to (7), wherein
the solid electrolyte layer includes a crystalline solid electrolyte, and
one or both of the cathode and the anode include the crystalline solid electrolyte.

(9)
A method of manufacturing a battery, the method including:
forming one or more of a cathode preparatory body, an anode preparatory body, and a solid electrolyte layer preparatory body to include a solid electrolyte binder; and
forming one or more of a cathode, an anode, and a solid electrolyte layer by heating the solid electrolyte binder.

(10)
The method of manufacturing the battery according to (9), wherein
the cathode preparatory body and the anode preparatory body include an active material capable of inserting and extracting an electrode reactant,
the solid electrolyte binder includes an element of the electrode reactant, a glass-forming element, and one of oxygen and sulfur as constituent elements, and
heating temperature of the solid electrolyte binder is equal to or higher than a glass transition temperature Tg.

(11)
The method of manufacturing the battery according to (9) or (10), wherein
both the cathode preparatory body and the solid electrolyte layer preparatory body include the solid electrolyte binder, and the solid electrolyte binder is heated after laminating the cathode preparatory body and the solid electrolyte layer preparatory body, or
both the anode preparatory body and the solid electrolyte layer preparatory body include the solid electrolyte binder, and the solid electrolyte binder is heated after laminating the anode preparatory body and the solid electrolyte layer preparatory body, or
all of the cathode preparatory body, the anode preparatory body, and the solid electrolyte layer preparatory body include the solid electrolyte binder, and the solid electrolyte binder is heated after laminating the cathode preparatory body and the anode preparatory body with the solid electrolyte layer preparatory body in between.

(12)
The method of manufacturing the battery according to any one of (9) to (11), wherein a coating method is used as a formation method of one or more of the cathode preparatory body, the anode preparatory body, and the solid electrolyte layer preparatory body.

It should be understood that various changes and modifications to the presently preferred embodiments described herein will be apparent to those skilled in the art. Such changes and modifications can be made without departing from the spirit and scope of the present subject matter and without diminishing its intended advantages. It is therefore intended that such changes and modifications be covered by the appended claims.

The invention claimed is:
1. A battery, comprising:
a cathode;
an anode;
a solid electrolyte layer including a polymer material; and
at least two types of solid electrolyte binders, wherein a first type of solid electrolyte binder of the at least two types of solid electrolyte binders has a first glass transition temperature and a second type of solid electrolyte binder of the at least two types of solid electrolyte binders has a second glass transition temperature,
wherein each of the at least two types of solid electrolyte binders has at least one $Li_xMO_y$ bond, where M is a glass-forming element, and x and y have values based on the glass-forming element,
wherein each of the cathode, the anode, and the solid electrolyte layer includes the at least two types of solid electrolyte binders.

2. The battery according to claim 1, wherein
the cathode and the anode include an active material capable of insertion and extraction of an electrode reactant, and
each of the at least two types of solid electrolyte binders includes an element of the electrode reactant, the glass-forming element, and one of oxygen (O) or sulfur (S) as constituent elements.

3. The battery according to claim 2, wherein each of the at least two types of solid electrolyte binders is glassy.

4. The battery according to claim 2, wherein
the electrode reactant is lithium (Li), and
one of the at least two types of solid electrolyte binders includes lithium as a constituent element.

5. The battery according to claim 2, wherein the glass-forming element is at least one of germanium (Ge), arsenic (As), tellurium (Te), gallium (Ga), titanium (Ti), bismuth (Bi), tungsten (W), molybdenum (Mo), niobium (Nb), or vanadium (V).

6. The battery according to claim 2, wherein, the at least two types of solid electrolyte binders are configured to flow into at least gaps between the active material by capillarity based on a heating of the at least two types of solid electrolyte binders at a temperature equal to or higher than the first glass transition temperature or the second glass transition temperature.

7. The battery according to claim 1, wherein the solid electrolyte layer includes a crystalline solid electrolyte of the polymer material, and at least one of the cathode or the anode include the crystalline solid electrolyte, wherein the crystalline solid electrolyte includes a sulfide or an oxide.

8. The battery according to claim 1, wherein the polymer material includes polyethylene oxide.

9. The battery according to claim 2, wherein one of the at least two types of solid electrolyte binders further includes a halogen element as one of the constituent elements.

10. An electronic apparatus, comprising:
a battery, wherein the battery includes:
a cathode;
an anode;
a solid electrolyte layer including a polymer material; and
at least two types of solid electrolyte binders, wherein a first type of solid electrolyte binder of the at least two types of solid electrolyte binders has a first glass transition temperature and a second type of solid electrolyte binder of the at least two types of solid electrolyte binders has a second glass transition temperature, wherein each of the at least two types of solid electrolyte binders has at least one $Li_xMO_y$ bond, where M is a glass-forming element, and x and y have values based on the glass-forming element,
wherein each of the cathode, the anode, and the solid electrolyte layer includes the at least two types of solid electrolyte binders.

11. An electric vehicle, comprising:
a battery, wherein the battery includes:
a cathode;
an anode;
a solid electrolyte layer including a polymer material; and
at least two types of solid electrolyte binders, wherein a first type of solid electrolyte binder of the at least two types of solid electrolyte binders has a first glass transition temperature and a second type of solid electrolyte binder of the at least two types of solid electrolyte binders has a second glass transition temperature, wherein each of the at least two types of solid electrolyte binders has at least one $Li_xMO_y$ bond, where M is a glass-forming element, and x and y have values based on the glass-forming element,
wherein each of the cathode, the anode, and the solid electrolyte layer includes the at least two types of solid electrolyte binders.

12. The battery according to claim 1, wherein the at least two types of solid electrolyte binders are configured to be heated to a higher temperature among the first glass transition temperature and the second glass transition temperature.

13. The battery according to claim 1, wherein the anode is laminated with the cathode with the solid electrolyte layer between the anode and the cathode, and wherein the at least two types of solid electrolyte binders bind a cathode active material of the cathode with the solid electrolyte layer, and the at least two types of solid electrolyte binders bind an anode active material of the anode with the solid electrolyte layer.

* * * * *